United States Patent
Chen et al.

(10) Patent No.: US 8,582,031 B2
(45) Date of Patent: Nov. 12, 2013

(54) SYSTEM AND METHOD OF TRANSMISSION AND DISPLAY OF PROGRESSIVE VIDEO WITH HINTS FOR INTERLACED DISPLAY

(75) Inventors: Sherman (Xuemin) Chen, San Diego, CA (US); Alexander G. MacInnis, Los Altos, CA (US)

(73) Assignee: Broadcom Corporation, Irvine, CA (US)

( * ) Notice: Subject to any disclaimer, the term of this patent is extended or adjusted under 35 U.S.C. 154(b) by 1755 days.

(21) Appl. No.: 10/349,663

(22) Filed: Jan. 22, 2003

(65) Prior Publication Data

US 2003/0137601 A1 Jul. 24, 2003

Related U.S. Application Data

(60) Provisional application No. 60/351,182, filed on Jan. 22, 2002, provisional application No. 60/384,234, filed on May 30, 2002, provisional application No. 60/441,072, filed on Jan. 17, 2003.

(51) Int. Cl.
*H04N 7/01* (2006.01)
*H04N 11/20* (2006.01)

(52) U.S. Cl.
USPC .................. 348/446; 348/441; 348/448

(58) Field of Classification Search
USPC ............... 348/446, 441, 448, 458, 555
See application file for complete search history.

(56) References Cited

U.S. PATENT DOCUMENTS

| | | | |
|---|---|---|---|
| 5,168,356 A | 12/1992 | Acampora et al. | 358/133 |
| 5,444,491 A * | 8/1995 | Lim | 348/441 |
| 5,461,420 A | 10/1995 | Yonemitsu et al. | 248/401 |
| 5,610,661 A * | 3/1997 | Bhatt | 348/446 |
| 5,754,248 A | 5/1998 | Faroudja et al. | |
| 5,771,357 A * | 6/1998 | Kato et al. | 709/247 |
| 6,069,664 A * | 5/2000 | Zhu et al. | 348/448 |
| 6,115,070 A | 9/2000 | Song et al. | 348/402 |
| 6,233,278 B1 | 5/2001 | Dieterich | |
| 6,493,392 B1 | 12/2002 | Moon et al. | 375/240.27 |
| 6,549,240 B1 * | 4/2003 | Reitmeier | 348/459 |
| 7,738,550 B2 * | 6/2010 | Kuhn | 375/240.01 |
| 2001/0028404 A1 | 10/2001 | Fukuhara et al. | 348/384.1 |
| 2001/0047517 A1 | 11/2001 | Christopoulos et al. | 725/87 |
| 2002/0001345 A1 | 1/2002 | Yamada et al. | 375/240.07 |
| 2003/0095197 A1 * | 5/2003 | Wheeler et al. | 348/241 |

FOREIGN PATENT DOCUMENTS

WO    WO-01/69936 A    9/2001

OTHER PUBLICATIONS

International Organization for Standardization, "Text of Committee Draft of Joint Video Specification (ITU-T Rec. H-264 ISO/IEC 14496-10 AVC) MPEG02/N4810", ISO/IEC JTC1/SC29/WG11 MPEG02/N4810, Fairfax, VA , USA, May 2002, pp. I-X, 1, XP001074690.

* cited by examiner

*Primary Examiner* — Trang U Tran
(74) *Attorney, Agent, or Firm* — Thomas | Horstemeyer, LLP (57) ABSTRACT

Systems and methods that transmit and display progressive video with hints for interlaced display are provided. The systems and methods may find use in, for example, digital video compression systems. In one embodiment, a system or a method encodes video by following the native frame rate of the source material and, if desirable, embeds hint information for interlaced display into the coded bitstream. Presentation times for coded pictures may be generated using the hint information. The hint information may be used or ignored.

30 Claims, 7 Drawing Sheets

$$pt'_j = \begin{cases} pts_j + d, & \text{for the film mode state 00 or 10;} \\ pts_j, & \text{for the film mode state 01 or 11.} \end{cases}$$

Where d is a constant with d = ½ F and F is the duration of a frame.

Fig. 1

| Film State | Transmitted Fields | Repeat First Field Flag | Top Field First Flag | Displayed Field |
|---|---|---|---|---|
| A | A1 | 0 | 1 | A1 |
|   | A2 |   |   | A2 |
| B | B1 | 1 | 1 | B1 |
|   | B2 |   |   | B2 |
|   |    |   |   | B1 |
| C | C1 | 0 | 0 | C2 |
|   | C2 |   |   | C1 |
| D | D1 | 1 | 0 | D2 |
|   | D2 |   |   | D1 |
|   |    |   |   | D2 |

Fig. 2

| Film mode states | Frame notation | Field parity | Displayed fields |
|---|---|---|---|
| 00 | A | a1 | a1 |
|  |  | a2 | a2 |
| 01 | B | b1 | b1 |
|  |  | b2 | b2 |
|  |  |  | b1 |
| 10 | C | c1 | c2 |
|  |  | c2 | c1 |
| 11 | D | d1 | d2 |
|  |  | d2 | d1 |
|  |  |  | d2 |

Fig. 3

| Decoded Film Sequence in Display Order | Film Mode States | Displayed Field with Hints | Displayed Frame without Hints |
|---|---|---|---|
| Frame 0 | 00 | Frm0Top<br>Frm0Bot | Frame 0 |
| Frame 1 | 01 | Frm1Top<br>Frm1Bot<br>Frm1Top | Frame 1 |
| Frame 2 | 10 | Frm2Bot<br>Frm2Top | Frame 2 |
| Frame 3 | 11 | Frm3Bot<br>Frm3Top<br>Frm3Bot | Frame 3 |
| Frame 4 | 00 | Frm4Top<br>Frm4Bot | Frame 4 |
| Frame 5 | 01 | Frm5Top<br>Frm5Bot<br>Frm5Top | Frame 5 |
| Frame 6 | 10 | Frm6Bot<br>Frm6Top | Frame 6 |
| Frame 7 | 11 | Frm7Bot<br>Frm7Top<br>Frm7Bot | Frame 7 |
| Frame 8 | 00 | Frm8Top<br>Frm8Bot | Frame 8 |
| Frame 9 | 00 | Frm9Top<br>Frm9Bot | Frame 9 |
| Frame 10 | 00 | Frm10Top<br>Frm10Bot | Frame 10 |

$$pt'_j = \begin{cases} pts_j + d, & \text{for the film mode state 00 or 10;} \\ pts_j, & \text{for the film mode state 01 or 11.} \end{cases}$$

Where d is a constant with d = ½ F and F is the duration of a frame.

Fig. 7

SYSTEM AND METHOD OF TRANSMISSION AND DISPLAY OF PROGRESSIVE VIDEO WITH HINTS FOR INTERLACED DISPLAY

RELATED APPLICATIONS

This application makes reference to, claims priority to and claims benefit from U.S. Provisional Patent Application Ser. No. 60/351,182, entitled "Method for Enabling Transmission and Display of Encoded Compressed Film Material in a Video Bit Stream" and filed on Jan. 22, 2002; U.S. Provisional Patent Application Ser. No. 60/384,234, entitled "Method for Enabling Transmission and Display of Encoded Compressed Film Material in a Video Bitstream" and filed on May 30, 2002; and U.S. Provisional Patent Application Ser. No. 60/441,072, entitled "Method for Enabling Transmission and Display of Encoded Compressed Film Material in a Video Bit Stream" and filed on Jan. 17, 2003.

INCORPORATION BY REFERENCE

The above-identified United States patent applications are hereby incorporated herein by reference in their entirety.

BACKGROUND OF THE INVENTION

In countries that use 525-line interlaced display systems such as, for example, the United States and Canada, television video signals are sampled and transmitted at approximately 59.94 fields per second (fps). For such countries, digital television video streams are generally encoded and transmitted by using a particular Moving Pictures Experts Group (MPEG) standard (i.e., MPEG-2 video) at approximately 29.97 frames per second (FPS).

Hereinafter, an integral value of fps or an integral value of FPS may be an approximation including, within its scope, a range of equivalent values. Thus, for example, the expression 30 FPS may be used to refer to rates such as, for example, approximately 29.97 FPS or approximately 30 FPS. Furthermore, the expression 24 FPS may be used to refer to rates such as, for example, approximately 23.976 FPS or approximately 24 FPS. Similarly, the expression 60 fps may be used to refer to rates such as, for example, approximately 59.94 fps or approximately 60 fps.

Figure 1:
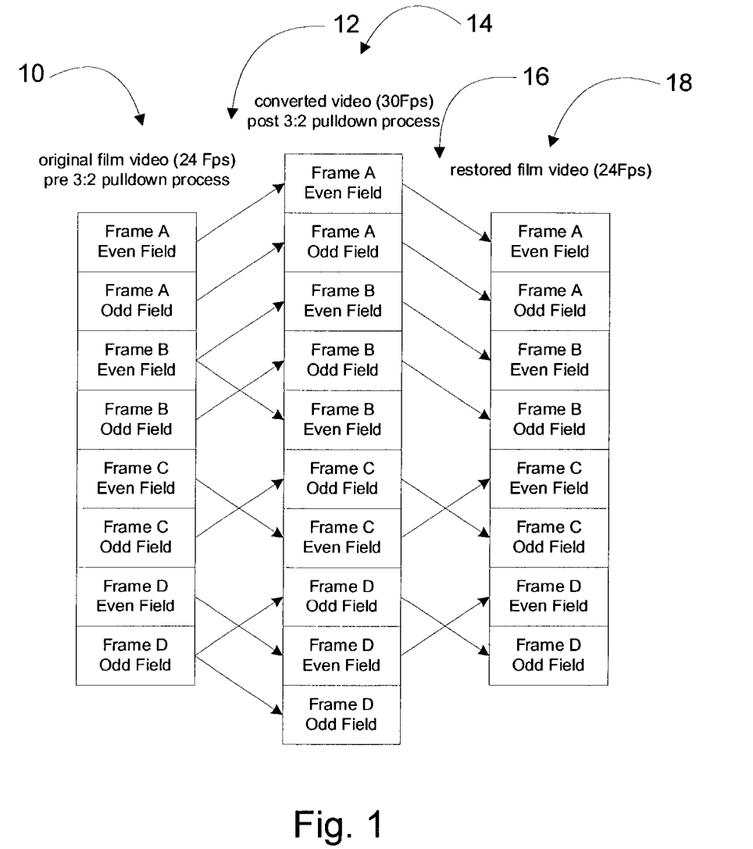
FIG. 1 illustrates an embodiment of a 3:2 pull-down process and an inverse 3:2 pull-down process.

Film material produced at 24 FPS is routinely converted to 60 fps in many applications. Broadcast networks usually encode and transmit movies that were originally filmed at 24 FPS and not at 60 fps. However, at the receiver, the decoded video at 24 FPS is often converted to 60 fps for interlaced display. A conventional process for converting 24 FPS to 60 fps sampling includes the Telecine Process (named after the original type of machine used to perform the conversion from film to video). It is also known as the 3:2 pull-down process. The Telecine Process inserts repeated fields derived from the original film frames in such a way that 5 video frames (i.e., 10 fields) are produced for every 4 original film frames. FIG. 1 illustrates one example of a process 12 that performs a 3:2 pull-down. The original film sequence 10 filmed at 24 FPS is converted to a video sequence 14 at 30 FPS or equivalently 60 fps.

For film material that has been converted to video, it is often desirable to restore the film sequence to a 24 FPS form prior to compression by eliminating, for example, the repeated fields inserted by the Telecine Process. Such a process reduces the amount of data for compression, thereby improving the quality of video or reducing the bit rate for transmission. The process of eliminating the repeated fields is commonly known as the inverse Telecine Process or the inverse 3:2 pull-down process. FIG. 1 also illustrates one example of the process 16 that performs an inverse 3:2 pull-down. The video sequence 14 at 30 FPS is restored or converted into the film sequence 18 at 24 FPS. The mechanism for handling the 3:2 pull-down and/or the inverse 3:2 pull-down for film material in digital video systems is usually referred to as film mode.

A film mode for encoding, decoding and displaying converted film material exists in MPEG-2 video. However, the use of the film mode in MPEG-2 video results in encoded streams that are specifically adapted for 30 FPS, interlaced display devices. Such adaptations may be disadvantageous for decoders that otherwise would benefit from having the content in 24 FPS form. Other examples include decoders that are coupled to progressive (non-interlaced) display devices or decoders that perform format conversion to, for example, high definition display devices.

When using the MPEG-2 video standard with the film mode, the frame rate encoded in the sequence header is 30 FPS for interlaced display, even though the video is actually coded as a 24 FPS film sequence. The encoder also conveys, to the decoder, proper display timing based on the frame rate of 30 FPS. The flags top_field_first and repeat_first_field in the picture coding extension header are used for indicating how a picture should be displayed. These. two flags are mandated as MPEG-2 syntax elements that are carried all the time and are followed by decoder. However, such inflexibility may not be desirable, particularly, when the type of display device can vary from, for example, an interlaced television to a progressive monitor. Furthermore, the encoder does not know the type of display employed at the decoder end.

Figure 2:
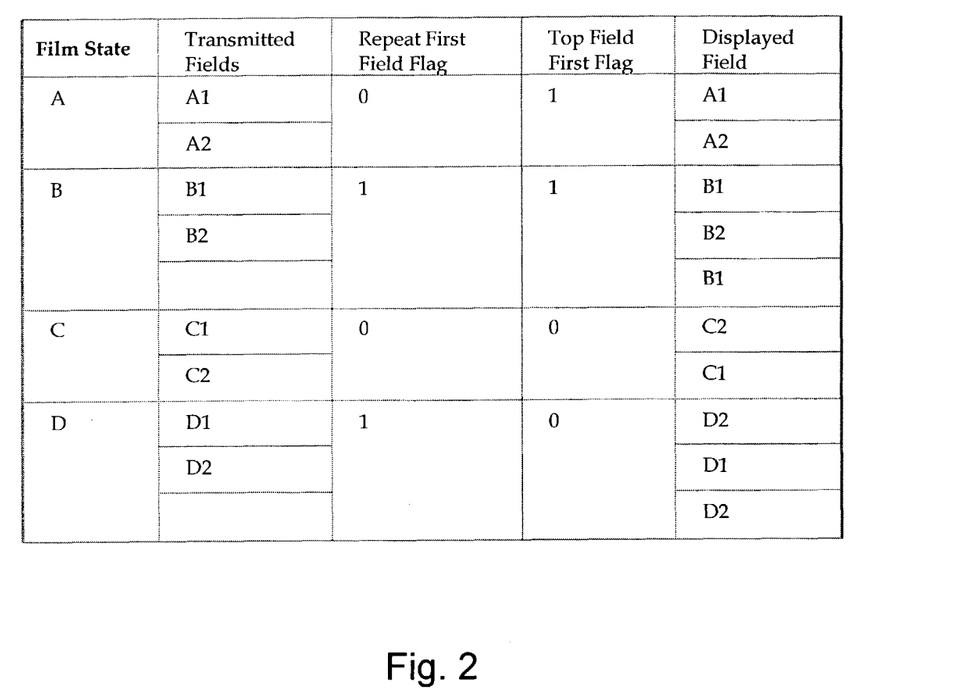
FIG. 2 illustrates a mapping between film states and flags in MPEG-2 video.

In MPEG-2 video elementary streams, the flags top_field_first and repeat_first_field are used to indicate the current film state. Four film states A, B, C and D are illustrated in FIG. 1. The four possible film mode states are generally repeated in the same order every four pictures. FIG. 2 illustrates the mapping between the film states and these 3:2 pull-down flags in MPEG-2 video.

Film mode encoding may refer to a situation in which an encoder directly compresses a 24 FPS sequence or in which an encoder uses an inverse 3:2 pull-down process to convert a 30 FPS video to a 24 FPS sequence and subsequently performs compression. If the input sequence prior to compression by an encoder is a 24 FPS film sequence, top_field_first and repeat_first_field flags indicate the "fields" that need to be repeated for a 30 FPS display device. If the input sequence is a 30 FPS video sequence that was converted from a film sequence, then a 3:2 pull-down detector is used to restore the film sequence prior to encoding. In this case, two repeated fields are removed from each ten-field sequence by the 3:2 pull-down detector as illustrated in FIG. 1.

In MPEG-2, the decoder generally follows the top_field_first and repeat_first_field flags to display film state B and D frames for three field times to re-construct the 3:2 pull-down pattern. The decoder re-displays the first field to create the third field. This is because, in the 3:2 pull-down algorithm, the first field is repeated every other picture to convert film material at 24 FPS to video mode at 30 FPS. Film state A and C pictures are displayed for only two field times. A film mode sequence of four pictures will therefore be displayed as a total of 10 field times. In this way, the decoded video is displayed at the correct video picture rate of 30 FPS. However, this may be undesirable for decoding systems that employ progressive displays or decoding systems that would otherwise benefit from direct 24 FPS progressive sequences.

In MPEG-2, the flags top_field_first and repeat_first_field along with the frame rate can also be applied to derive Decoding Time Stamps (DTS) and Presentation Time Stamps (PTS) for some pictures. The flags (i.e., top_field_first and repeat_first_field) are used to achieve proper timing for decoding and displaying the coded 24 FPS film material to generate output video at 30 FPS. However, this may not be desirable when the display device is not an interlaced television (e.g., a progressive monitor). In general, the encoder does not know the type of display employed at the decoder end. The problem may be further compounded because, in broadcast systems, there may be many decoders decoding the same signal and a number of different types of monitors being employed to display the same signal. In markets where 60 fps interlaced televisions are most common, current broadcast systems commonly use the MPEG-2 film mode flags and therefore create compressed bit streams that are optimized for display only on 60 fps interlaced displays. However, such an assumption may no longer be valid in light of the massive deployment of progressive displays. Furthermore, the increased proliferation of high definition, 60 fps interlaced displays also challenges the assumptions made in conventional systems. Methods of converting standard definition content for display on such devices uses progressive frame-based video signals where possible, instead of fields of video.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Aspects of the present invention may relate to systems and methods that transmit and/or display progressive video with one or more hints for use with interlaced display. In one embodiment, the present invention may provide a method that includes, one or more of the following: encoding video by following a native frame rate of a source material; and, if desired, then embedding hint information relating to interlaced display into a coded bitstream. Some decoder embodiments may generate modified video picture presentation times using the hint information (e.g., the hint messages). However, some decoder embodiments may use or may ignore the embedded hint messages.

In another embodiment, the present invention may provide a method that provides optional hint messages in encoded bit streams to facilitate decoding and display of converted film material in a way that meets the needs of many applications. The method may include, for example, decoupling an encoding process from details of the display.

In yet another embodiment, the present invention may provide a system or a method that encodes film material at an actual normal film frame rate (e.g., 24 FPS) in a progressive sequence. In one example, the encoder may not make any consideration for the display or may not need to make any consideration for the display. The encoder may include an option, however, to provide optional messages that indicate, to the decoder, the intended field polarity and repeat pattern used for interlaced and 3:2 pull-down display. Encoders may switch dynamically between, for example, 30 FPS coding and 24 FPS encoding, if necessary, to accommodate uncertainties that may arise, for example, when performing inverse 3:2 pull-down from analog sources.

In yet still another embodiment, the present invention may provide a method that extracts one or more hint messages from a bitstream and that applies the one or more hints for display. Decoders may choose to use or to ignore the one or more hint messages. Decoders that prefer to process decoded video as progressive sequences at the film frame rate may ignore the messages. Decoders that benefit from determining the 3:2 pull-down sequence intended by the encoder may use at least some of the one or more hint messages, when included by the encoder. In one example, modified presentation times may be generated using the one or more hint messages.

Unlike MPEG-2 film mode flags, some of the embodiments of the present invention may not complicate or may simplify the video buffer model in the hypothetical reference decoder portion of the video standard since, for example, the frame rate and buffer removal times may not be affected by the film mode messages.

Some embodiments of the present invention may provide a more flexible solution for handling the film mode. For example, a video compression engine on the transmitter side may not be aware of the type of display device on the receiver side. In another example, a decoder on the receiver side may decide how to display the received contents.

Some embodiments of the present invention may be compatible with some of the MPEG standards. One embodiment according to the present invention may be compatible with, for example, the latest video compression standards (e.g., MPEG-4 AVC). Another embodiment according to the present invention may be compatible with, for example, existing video transport standards (e.g., MPEG-2 Systems).

These and other features and advantages of the present invention may be appreciated from a review of the following detailed description of the present invention, along with the accompanying figures in which like reference numerals refer to like parts throughout.

DETAILED DESCRIPTION OF THE INVENTION

Some aspects of the present invention may relate to systems and methods that transmit and display progressive video with hints for interlaced display. Some applications within the scope of the present invention may find use in, for example, digital video compression systems and methods. Some embodiments according to the present invention may be suitable for use in and compatible with some MPEG standards (e.g., MPEG-4 AVC standard as described in, for example, document JVT-E146d37ncm.doc, entitled "Joint Video Specification (ITU-T Rec. H.264|ISO/IEC 14496-10 AVC)", incorporated herein by reference in its entirety).

Some aspects of the present invention may relate to a picture-level optional hint message for display related information that indicates how the picture should be displayed on interlaced monitors. The hint message may be used to facilitate the coding and display of, for example, converted film material.

Figure 3:
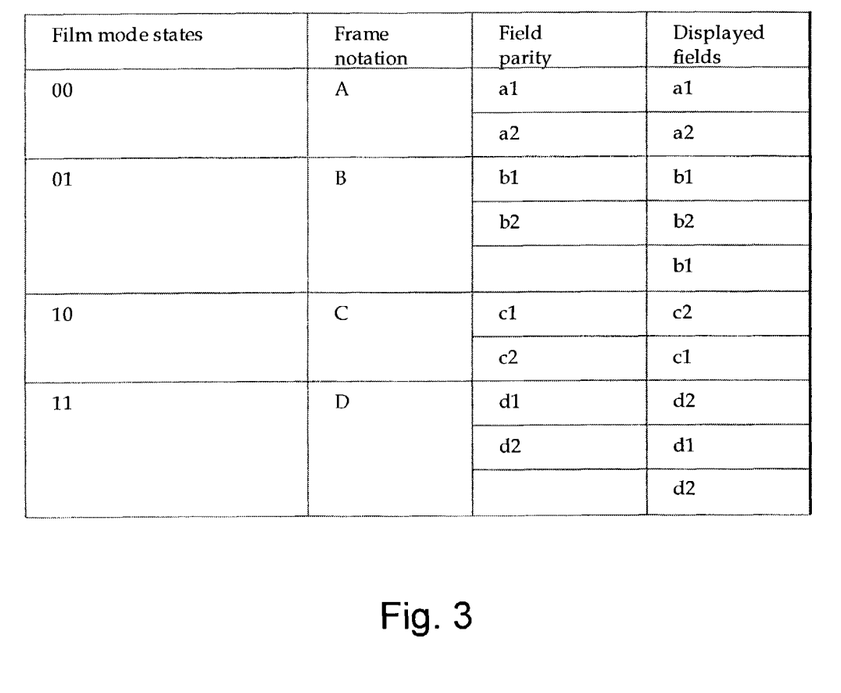
FIG. 3 illustrates an embodiment of film mode states carried by optional hint messages for interlaced display according to the present invention.

The optional hint message may relate to film mode states as illustrated in FIG. 3. For example, the film mode state 00 indicates the display order as top field first and bottom field second. The film mode state 01 indicates the display order as top field first, bottom field second and then repeating the top field. The film mode state 10 indicates the display order being bottom field first and top field second. The film mode state 11 indicates the display order being bottom field first, top field second and then repeating the bottom field. The four film mode states correspond to four frame types A, B, C and D of the 3:2 pull-down process as illustrated in FIGS. 1 and 2. For each coded picture, the optional hint message may carry one of the film mode states.

The encoding and display processes may be decoupled using the hint messages to support interlaced display. For example, a film sequence may be originally coded at the frame rate of 24 FPS. Hint messages may be inserted in each picture-level header to indicate the 3:2 pull-down process for interlaced display. In one embodiment, it is different from typical use of MPEG-2 video because the frame rate here is the rate for actual coded frames.

Figure 4:
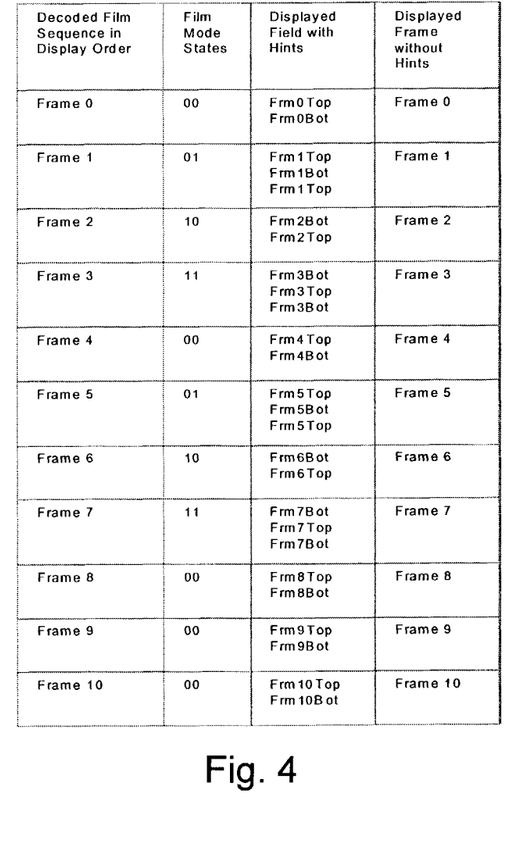
FIG. 4 shows an embodiment of an original film sequence and a video sequence with the 3:2 pull-down included and processed according to the present invention.

FIG. 4 illustrates an example of the original progressive sequences and the video sequence with the hints for the 3:2 pull-down process. Decoders may be free to ignore or to use the optional hint messages. Decoders with progressive display devices may, for example, ignore the hints. Decoders with interlaced display devices may, for example, use those hints in a manner that is similar to the MPEG-2 film mode.

Figure 5:
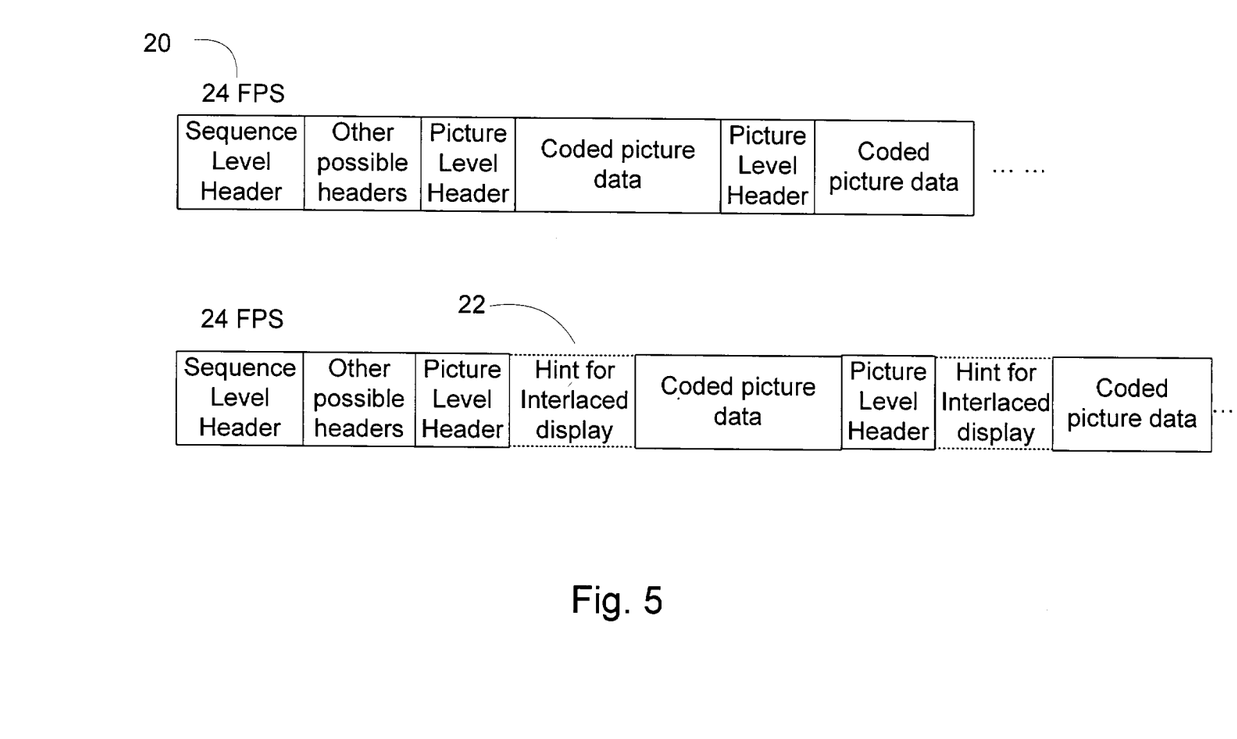
FIG. 5 illustrates embodiments of coded video streams with and without optional hint messages according to the present invention.

FIG. 5 illustrates coded video streams with and without the optional hint messages. In one embodiment, the frame rate may be carried, for example, in a sequence level header 20. The optional hint message may be carried, for example, in a picture level header 22. In another embodiment, the hint messages may be inserted in each picture-level header of a progressive-coded video sequence to directly indicate the intended interlaced display. For example, the hint message may indicate, for example, using film mode state 00 or the film mode state 10 as illustrated in FIG. 4.

Even if a different video encoding specification from MPEG-2 is used to compress the video, it may still be useful to employ the MPEG-2 Systems specification (e.g., Transport stream) to transmit the encoded bit stream due to the wide range of equipment implementing this specification and the proven performance and reliability of the specification. Accordingly, some embodiments according to the present invention may exploit the current investment in the transmission and delivery infrastructure. Some embodiments of the present invention may also provide encoding systems that are able to code progressive frames or interlaced video frames, as or if needed, without making implicit assumptions about the nature of the display devices.

In one embodiment, the present invention may provide a system or a method that encodes the film material at the actual desired film frame rate (e.g., 24 FPS) in a progressive sequence. Although the encoder may have knowledge about the type of display attached to the decoder at the other end of the transmission channel, the encoder need not have knowledge about the type of display attached to a decoder at the other end of the transmission channel. The encoder may embed hints in the coded bit stream about how to display the encoded content, while keeping the timing information of the encoded video based on a source temporal sampling. Accordingly, in some cases, the time-stamping process for DTS and PTS in MPEG-2 Systems may be different than that for MPEG-2 Video.

In an MPEG-2 System encoder when used with MPEG-2 Video, in addition to considering picture reordering when B-pictures are present, each picture may be checked to determine whether it has been coded in the film mode to correctly compute the PTS and DTS. For an MPEG-2 coded film sequence with the 3:2 pull-down enabled (30 FPS), when it is carried by MPEG-2 systems, two of every four frame pictures have a presentation duration of three fields (i.e., one and one-half times the nominal frame period) when repeat_first_field=1, while the other two frame pictures have a presentation duration of two fields (i.e., the nominal frame period) when repeat_first_field=0. The DTSes for this coded sequence are generated in a similar manner as the PTS by properly using the repeat_first_field flag.

Figure 6:
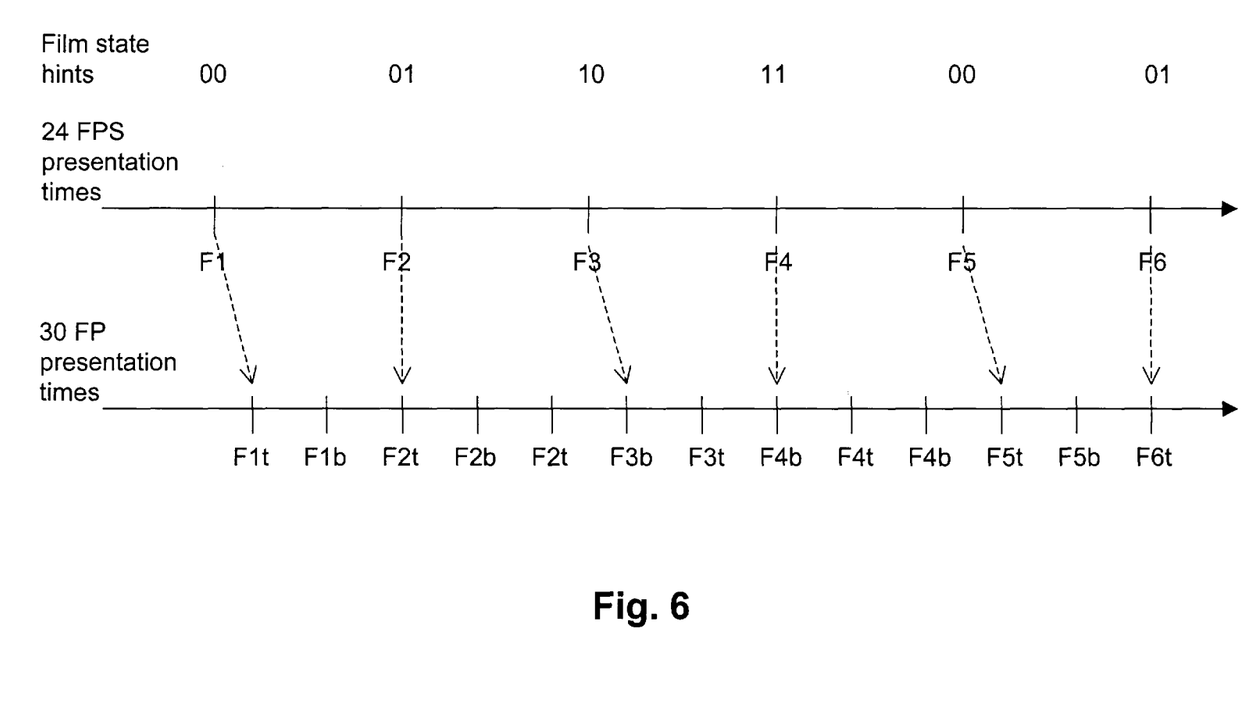
FIG. 6 illustrates an embodiment of a series of frames coded at 24 FPS including film state hints according to the present invention.

FIG. 6 illustrates a series of frames coded at 24 FPS including the film state hints. As illustrated, F1 indicates frame 1, F2 indicates frame 2, etc. The presentation times indicated in the bit stream correspond to a frame rate of 24 FPS as shown in the upper time line. The lower time line illustrates the modified presentation times created by an embodiment of a decoder that displays the decoded video at 30 FPS interlaced (i.e., 60 fps). As illustrated, F1$t$ indicates top field display of frame 1, F1$b$ indicates bottom field display of frame 1, etc. The presentation times of F1$t$, F3$b$ and F5$t$ may be delayed from the presentation times indicated in the stream by half of the interval between 60 fps fields to ensure that pictures may be presented no sooner than they would have been if they were presented at the times indicated in the stream to prevent underflow of the decoders data buffer. Alternatively, the presentation times of the decoder may be delayed more, less or not at all. FIG. 6 also illustrates the field display patterns of the four film states including the repetition of the first field displayed in the cases of film state 01 and film state 02.

Some embodiments of the present invention contemplate that the film state hint messages may be carried in the coded video stream to indicate a 3:2 pull-down process similar to that which are indicated using MPEG-2. For example, the DTS and the PTS may be generated by an MPEG-2 System encoder for a coded video stream (e.g., an MPEG-4 AVC stream). The PTS and DTS values may not be affected by the use or non-use of the film state hint messages.

Some embodiments of the present invention may relate to a system or a method that extracts hint messages from a bitstream and applies the hint messages for display. Decoders may choose to use or to ignore the hint messages in generating the presentation times for a video stream.

Figure 7:
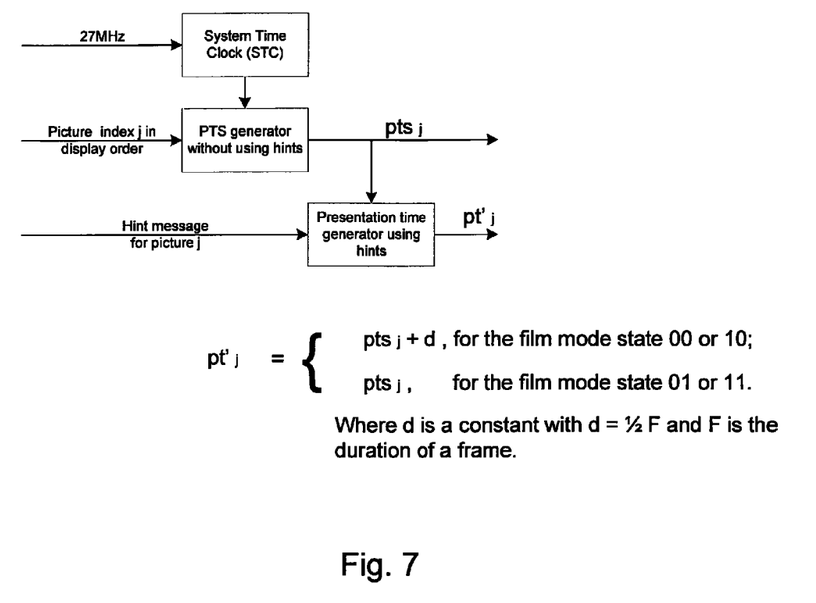
FIG. 7 illustrates an embodiment of a method that derives a presentation time for each picture using hint messages according to the present invention.

FIG. 7 illustrates an embodiment of a method that generates a presentation time for each picture using hint messages. The presentation time for picture j using the hint message may be derived from the PTS for the picture j carried in the MPEG-2 Systems stream (e.g., a Transport stream) or from equivalent presentation time information carried via other protocols or means. The relationship between the presentation time value pt'j and the PTS value is illustrated in FIG. 7. In one example, for pictures with film state 00 or film state 10, the decoder generates presentation times that may be delayed from the time indicated by the PTS values or equivalent. The delay time may be approximately equal to one field time (i.e., half a frame time). In FIG. 7, the constant offset d=½ F. Note that, in practical implementations, the pt' values may be rounded to integer values of a reference clock such as, for example, 90 kHz.

Some embodiments of the present invention do not complicate the video buffer model aspect of the video standards such as, for example, the Hypothetical Reference Decoder model of MPEG AVC, since the frame rate, buffer removal times and presentation times indicated in the bit stream may not be affected by the film state hint messages.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for facilitating a display of moving video, the method comprising:
   encoding moving video into a non-interlaced format at a frame rate;
   embedding the encoded moving video and hint information into a coded bitstream, the hint information comprising an indication of a field display order relating to displaying the encoded moving video on an interlaced display; and
   embedding within the coded bitstream the frame rate for the non-interlaced format of the encoded moving video,
   wherein the coded bitstream enables the moving video to be presented as the non-interlaced format at the embedded frame rate or as an interlaced format using the embedded hint information, as selected by a video receiver.

2. The method according to claim 1, further comprising, at the video receiver:
   receiving the coded bitstream; and
   responsive to the video receiver selecting for the moving video to be presented in the interlaced format, determining a presentation time based, at least in part, on the hint information embedded in the received coded bitstream.

3. The method according to claim 1, further comprising, at the video receiver:
   receiving the coded bitstream; and
   ignoring the hint information embedded in the received coded bitstream if the video receiver is providing a progressive video output.

4. The method according to claim 1, further comprising, at the video receiver:
   receiving the coded bitstream; and
   using the hint information embedded in the received coded bitstream if the video receiver is providing an interlaced video output.

5. The method according to claim 1, wherein the embedded hint information is an optional hint message.

6. The method according to claim 5, wherein embedding the hint information into the coded bitstream comprises embedding the optional hint message in a picture level header of the coded bitstream.

7. The method according to claim 1, wherein the hint information comprises information related to a 3:2 pull-down process.

8. The method according to claim 1, wherein the hint information comprises information related to at least one film mode state.

9. The method according to claim 1, wherein the encoding moving video into the non-interlaced format comprises encoding a film sequence.

10. The method according to claim 9, wherein the film sequence is originally coded at approximately 24 frames per second.

11. The method according to claim 1, further comprising:
    decoupling the encoding from a display process using the hint information.

12. The method according to claim 1, further comprising:
    transmitting or delivering a transport stream across MPEG Systems infrastructure, the transport stream comprising the encoded moving video.

13. The method according to claim 1, wherein the encoding moving video for the non-interlaced format comprises encoding moving video at a film frame rate.

14. The method according to claim 13, wherein the encoding moving video for the non-interlaced format comprises encoding moving video at approximately 24 frames per second in a progressive sequence.

15. The method according to claim 1, wherein the hint information does not substantially affect at least one of a frame rate, a buffer removal time, or a presentation time.

16. The method according to claim 1, further comprising embedding timestamp information into the coded bitstream, where the timestamp information is compatible with presentation of the encoded moving video on a non-interlaced display.

17. The method according to claim 1, further comprising:
    receiving the coded bitstream; and
    determining video presentation time based, at least in part, on the hint information embedded in the received coded bitstream.

18. The method according to claim 17, further comprising:
    embedding the frame rate for non-interlaced video display into the coded bitstream;
    receiving the coded bitstream; and
    displaying frames from the received coded bitstream at a frame rate different from the frame rate embedded into the coded bitstream.

19. A system for facilitating a display of moving video, the system comprising:
    a transmitter that operates to, at least:
       encode moving video into a non-interlaced format at a frame rate; and
       embed the encoded moving video and hint information into a transmitted bitstream, the hint information comprising an indication of a field display order for information relating to displaying the encoded moving video on an interlaced display; and
       embed within the coded bitstream the frame rate for the non-interlaced format of the encoded moving video,
       wherein the transmitted bitstream enables the moving video to be presented as the non-interlaced format at the embedded frame rate or as an interlaced format using the embedded hint information, as selected by a receiver.

20. The system according to claim 19, wherein the transmitter comprises an encoder that operates to embed the hint information into the transmitted bitstream.

21. The system according to claim 19, further comprising:
the receiver coupled to the transmitter via a network,
wherein the transmitter comprises an encoder with no knowledge about a type of display coupled to the receiver.

22. The system according to claim 19, further comprising the receiver that operates to, at least:
receive the transmitted bitstream; and
process the received bitstream for presentation of the encoded moving video on a non-interlaced display, where said processing comprises ignoring the hint information embedded in the received bitstream.

23. The system according to claim 19, further comprising the receiver that operates to, at least:
receive the transmitted bitstream; and
process the received bitstream for presentation of the encoded moving video on the interlaced display, where said processing comprises utilizing the hint information embedded in the received bitstream to adapt the encoded moving video from a noninterlaced video format to an interlaced video format.

24. The system according to claim 23, wherein said processing comprises determining video presentation time for interlaced display using the hint information embedded in the received bitstream to adjust timing information for non-interlaced display embedded in the transmitted bitstream.

25. The system according to claim 24, wherein said processing comprises generating video field presentation times by, at least in part, generating presentation time offsets based, at least in part, on the hint information embedded in the received bitstream.

26. A system for facilitating a display of moving video, the system comprising:
a receiver that operates to, at least:
receive a video bitstream comprising encoded moving video, the video bitstream further comprising an embedded frame rate for the encoded moving video and hint information, where the encoded moving video is encoded into a non-interlaced format at the frame rate and the hint information comprises an indication of a field display order for processing the encoded moving video for an interlaced display;
select either the non-interlaced format or an interlaced format for presentation on a display; and
decode the encoded moving video of the received video bitstream for presentation on the display in accordance with the format selected by either presenting the moving video as the non-interlaced format at the embedded frame rate or presenting the moving video as an interlaced format using the embedded hint information.

27. The system according to claim 26, wherein the receiver operates to process the encoded moving video of the received video bitstream for presentation on a noninterlaced display by, at least in part, ignoring the hint information embedded in the received video bitstream.

28. The system according to claim 26, wherein the receiver operates to process the encoded moving video of the received video bitstream for presentation on the interlaced display by, at least in part, utilizing the hint information of the received video bitstream to adapt the encoded moving video from a non-interlaced video format to an interlaced video format.

29. The system according to claim 28, wherein the receiver operates to utilize the hint information of the received video bitstream to determine video presentation time by, at least in part, generating video presentation time offsets based on the hint information of the received video bitstream.

30. The system according to claim 26, wherein
the receiver operates to process the encoded moving video of the received video bitstream for presentation on the display by, at least in part, utilizing the hint information of the received video bitstream to generate video presentation times which result in a frame rate different from the frame rate embedded in the video bitstream.

\* \* \* \* \*